C. R. LOTT.
MECHANISM FOR TRANSFERRING WARE TO LEERS.
APPLICATION FILED OCT. 14, 1918.
1,338,992.
Patented May 4, 1920.
3 SHEETS—SHEET 1.
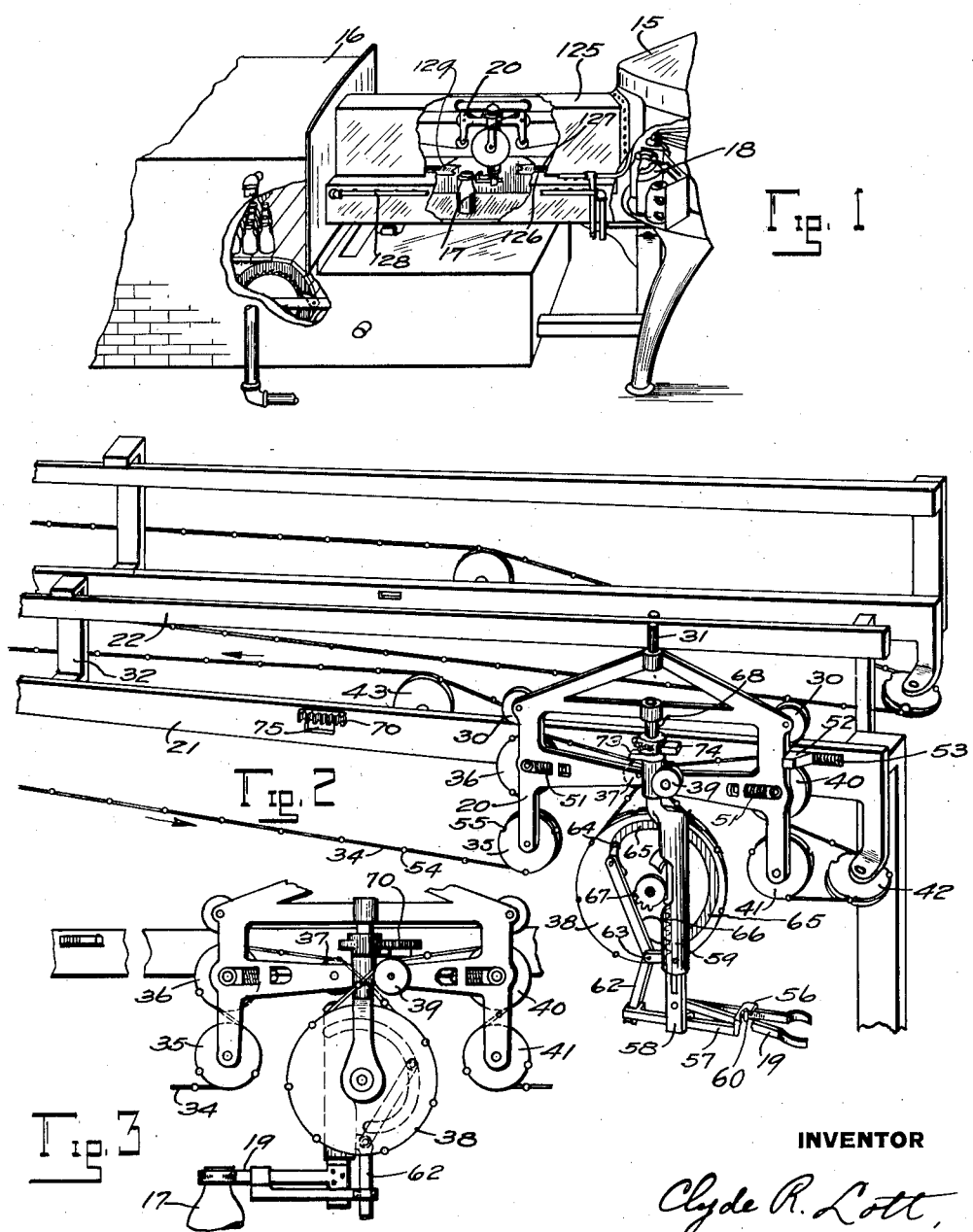

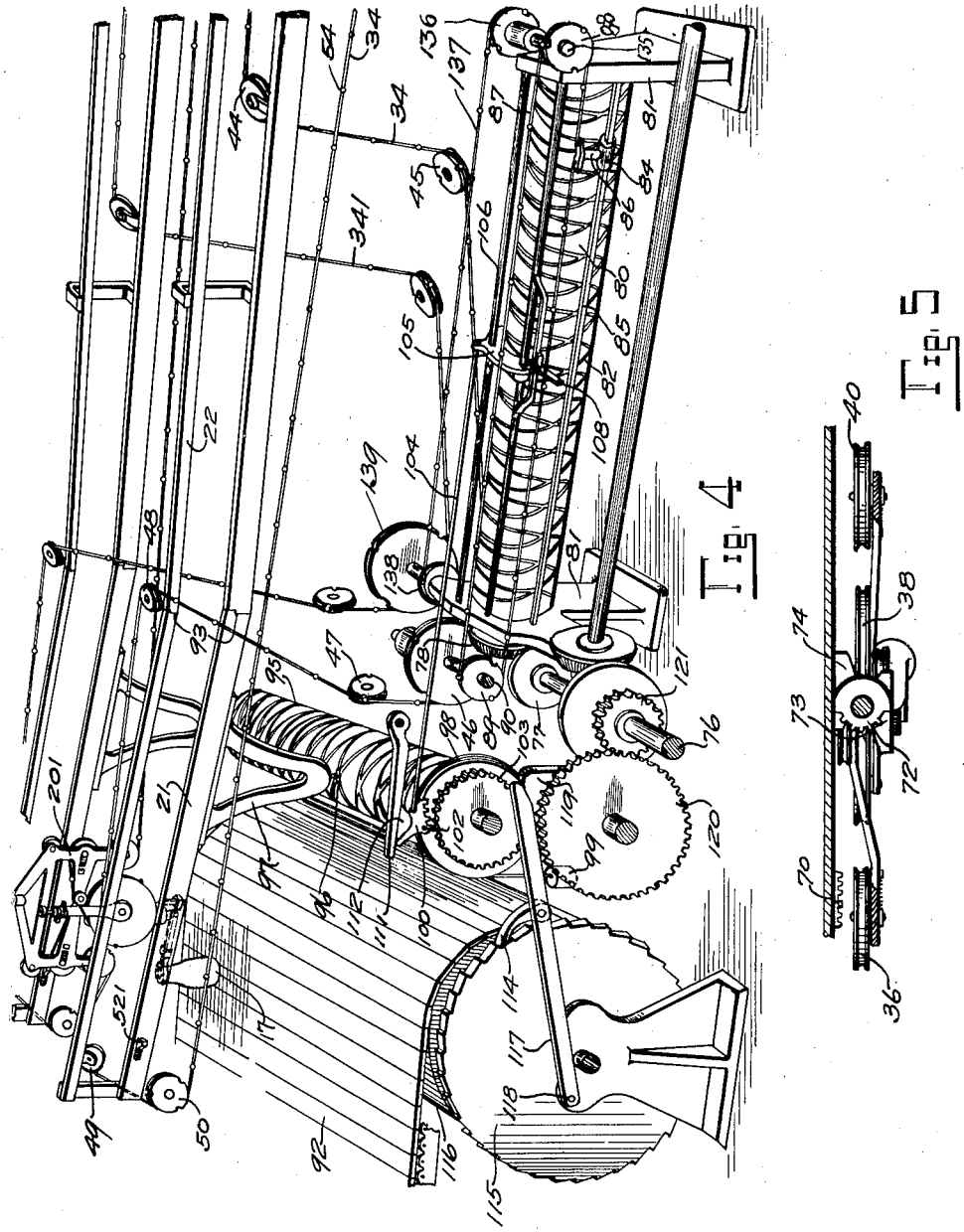

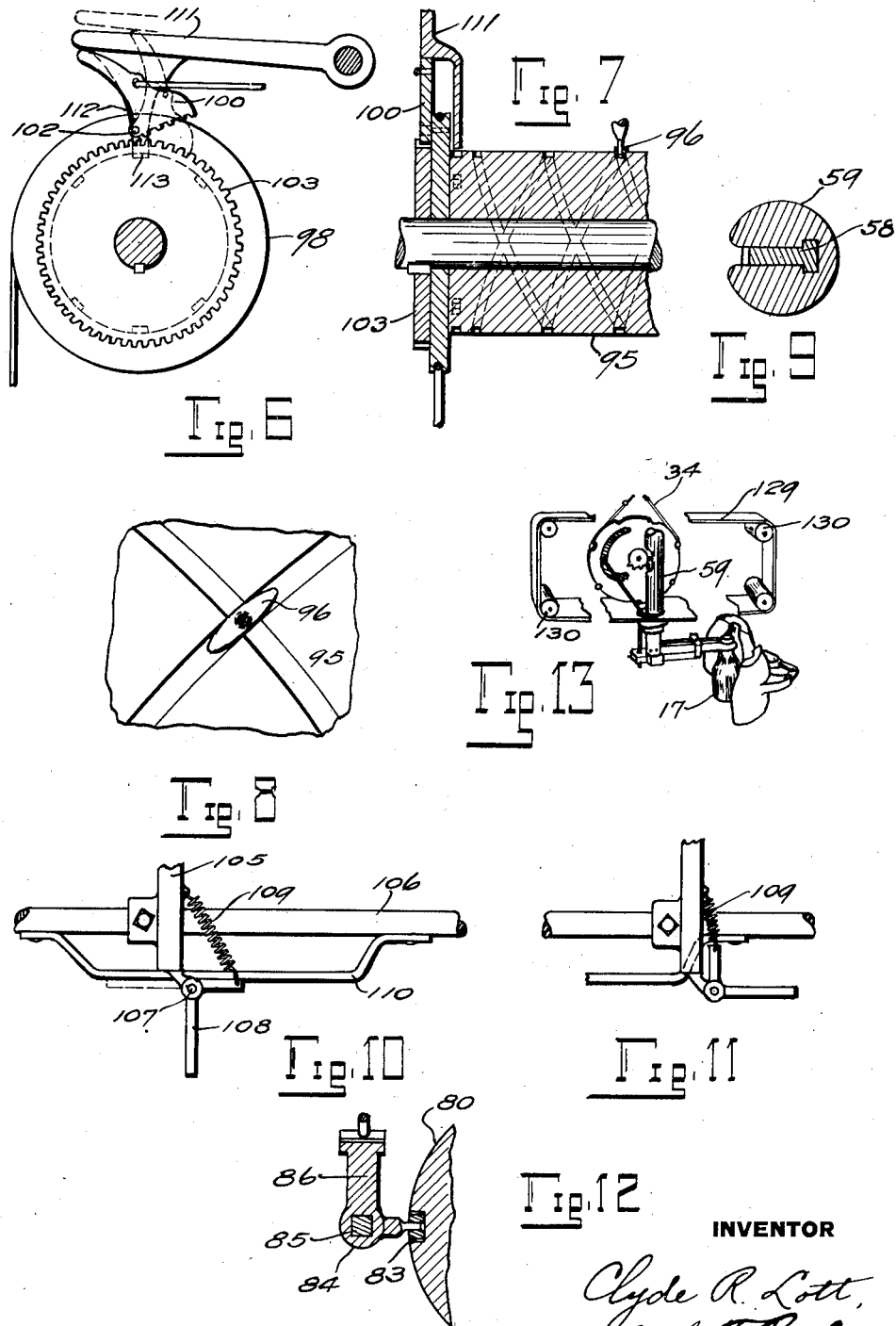

UNITED STATES PATENT OFFICE.

CLYDE R. LOTT, OF WASHINGTON, DISTRICT OF COLUMBIA, ASSIGNOR TO THE GUARDIAN TRUST AND SAVINGS BANK OF TOLEDO, OF TOLEDO, OHIO, A CORPORATION OF OHIO.

MECHANISM FOR TRANSFERRING WARE TO LEERS.

1,338,992. Specification of Letters Patent. Patented May 4, 1920.

Original application filed September 27, 1909, Serial No. 519,678. Divided and this application filed October 14, 1918. Serial No. 257,930.

*To all whom it may concern:*

Be it known that I, CLYDE R. LOTT, a citizen of the United States, residing at Washington, in the District of Columbia, have invented new and useful Improvements in Mechanism for Transferring Ware to Leers, of which the following is a specification.

My invention relates to apparatus particularly adapted for transferring bottles or other ware from a glass forming machine to a leer. An object of the invention is to provide a practical and reliable apparatus for this purpose, comprising a gripping and carrying device for taking the bottles from the finishing molds, carrying them to the leer and depositing them therein. The invention is not restricted, however, in its use to glass ware, as it can be used for conveying various other kinds of ware, as for example, porcelain ware, china ware, vitreous brick, ceramics, etc.

A further feature of the invention consists in providing means whereby the bottles or other articles during their transfer from the molds to the leer, are inclosed in a compartment in which heat conditions are controlled to suit the character of ware being transferred. A uniformly heated atmosphere may be maintained in this compartment so that the ware is protected against the cooling effects of the outside air or uneven chilling while being transferred. Where the invention is used for transferring articles a considerable distance, and for certain kinds of ware, a graduated temperature may be maintained so that the ware passes gradually from a higher to a lower temperature. Also a gradual reducing or lowering temperature can be produced at the will of the operator.

Further, with my invention heat may be locally applied to certain parts of the glass ware, raising the temperature of such parts to a much higher degree than the rest of the article, as for instance, directing a flame on the bottom or top of the ware for fire polishing, removing shear marks, etc. As my invention is applicable to nearly all of the numerous and variuos kinds of glass articles there are some instances where it is desirable to introduce a cooling medium into the passage, either to reduce the temperature of the entire article, or such cooling medium can be directed on any particular part of the article.

The kind of temperature treatment, whether heating or cooling, and whether applied locally to certain parts of the article or to the entire article, the degree of temperature, etc., depend on the shape, weight and thickness of the article and the results desired. For example, with a decanter having a long neck and heavy body it may be desirable to apply heat locally to the neck to prevent it from cooling more rapidly than the body. On the other hand, a heavy carboy might call for the use of a cooling medium for reducing the temperature of the entire passageway.

Other objects of the invention and the exact nature thereof will appear hereinafter.

The present application is in part a continuation of my co-pending application, Serial Number 519,678.

In the accompanying drawings: Figure 1 is a perspective view showing the bottle transferring apparatus, portions of the inclosing casing being broken away.

Fig. 2 is a perspective view on a larger scale of the outer portion of the conveying apparatus, the carrier being at the outer end of its travel.

Fig. 3 is a fragmentary elevation of the carrier.

Fig. 4 is a perspective view of the portion of the apparatus adjacent to the leer.

Fig. 5 is a sectional plan of the carriage.

Fig. 6 is a view of the driving gear on the track shifting drum.

Fig. 7 is a fragmentary section of said gear and drum.

Fig. 8 is a detail of the driving connection between the track and the drum.

Fig. 9 is a section of a vertical bar for lifting the gripper, and its surrounding casing.

Fig. 10 is a detail of a driving device for the drum which moves the tracks transversely of the leer.

Fig. 11 is a similar view of the parts in a different position.

Fig. 12 is a fragmentary view of the carriage driving drum and its connection with the carriage driving cable.

Fig. 13 is a perspective view showing a portion of the carriage and a belt forming part of the inclosure for the ware.

The apparatus as herein shown is designed for conveying bottles or other ware from a finishing machine 15 (Fig. 1) to an annealing oven or leer 16. The bottle 17 or other article is taken from the open finishing molds 18 by means of a pair of tongs or gripping jaws 19 (Fig. 2) on a carriage 20, the carriage being then drawn on tracks 21, 22 toward the leer to carry the bottle into the leer. The bottle gripping device 19 is in the meantime rotated about a vertical axis to project the bottle toward the leer and after the bottle is brought over the leer conveyer the jaws are separated to release the bottle. The inner end of the track is moved horizontally step by step across the leer so that the bottles are arranged in rows extending transversely of the leer.

As shown in the drawings, there are two conveying outfits each comprising a bottle gripping device, a carriage and guide rails for the carriage. The bottles are conveyed alternately by the two carriages, the arrangement permitting the bottles to be taken from the finishing molds as rapidly as they are ordinarily supplied by a machine, without operating the transfer mechanism at an excessive speed. It will be understood, however, that a greater or less number of carriers may be employed as conditions require, each carrier comprising a bottle gripping device and its carriage.

Each carriage 20 comprises a frame having wheels 30, which run on the lower rail 21, and guide pins or rolls 31 which run on opposite sides of the upper rail 22. The rails 21 and 22 may be united by brackets 32. The carriage is driven by an endless chain or cable 34 to which motion is transmitted, as hereinafter explained. The cable 34 runs over sheaves or pulleys 35, 36, 37, 38, 39, 40 and 41 on the carriage, the cable engaging said pulleys in the order named. From the sheave 41 the cable extends around stationary guide sheaves 42, 43 and thence to sheaves 44, 45 (Fig. 4) 46, 47, 48, 49, 50 and back to the sheave 35 on the carriage. The chain 34 is driven from the driving pulley 46 which is rotated (by means hereinafter explained) first in one direction and then in the other to reciprocate the carriage 20.

The sheaves 36 and 40 have their axles mounted in slots in the frame, permitting them to yield inwardly against the tension of springs 51. These springs normally maintain sufficient tension on the chain to prevent the latter from running on the sheaves on the carriage, so that the latter is caused to travel on the rails. As the carriage reaches the end of its travel away from the leer it is arrested by a stop 52, the latter permitted to yield by a buffer spring 53. When the carriage is thus arrested the continued movement of the chain 34 serves to rotate the sheaves on the carriage so that the sheave or cam disk 38 is driven to actuate the gripper 19, as will be presently described. The chain 34 is provided with buttons or knobs 54 at regular intervals, which engage correspondingly spaced notches 55 in the several sheaves over which the chain runs, thereby effecting a positive drive of said sheaves.

The gripping arms 19 are moved toward each other by means of a ring 56 slidable along said arms, and may be separated by a bar 60 extending through the ring between the gripping arms to act as a spreader when the ring is drawn back. Said ring is carried on a rod 57 slidable horizontally on a vertical bar 58, the latter being arranged to reciprocate vertically in a hollow stem or sleeve 59. The rod 57 is reciprocated by a lever 62 pivoted at 63 to a lug on the sleeve 59, the upper end of the lever having a roll 64 which runs in a cam groove 65 in the face of the disk 38. The initial rotation of the cam disk moves the upper end of the lever outward and moves the jaws to bottle gripping position. The rack bar 58 is formed with rack teeth 66 which as the disk rotates are brought in mesh with teeth 67 of a mutilated gear on the disk, so that continued rotation of the disk moves the said rack bar and the gripper 19 upward.

The hollow rod 59 forms one side of a yoke in which the disk 38 is mounted, said yoke having a vertical stem 68 journaled in bearings on the carriage, permitting said yoke to oscillate horizontally through a half revolution or an arc of 180 degrees. This movement is effected by a rack 70 on the track 21 which engages gear teeth 72 (Fig. 5) on said stem as the carriage moves toward the leer. Projecting lugs 73 and 74 on said stem move along the face of the bar 21 and limit or prevent turning movement of the gripper except when positively operated by the rack 70 at which time the lug 73 enters a slot 75 in the bar 21. As the carriage returns the gripper is rotated in the reverse direction when it reaches the rack 70.

The mechanism for driving the chain 34 will now be described. Referring to Fig. 4, a drive shaft 76 has secured thereto a bevel gear 77 running in mesh with a gear 78 on the shaft of a carriage driving drum 80 journaled in a frame 81. This drum has formed in its periphery a continuous spiral groove or cam slot 82 in which runs a finger 83 (Fig. 12) connected with a sleeve 84, the latter slidable on a square rod 85 (Fig. 4) extending lengthwise of the drum. A stem 86 extending upward from said sleeve has connected thereto the ends of a chain 87 running on sheaves 88 and 89 adjacent the ends of the drum. As the drive shaft 76 rotates the drum, the sleeve 84 is driven by a spiral cam the length of the drum first in one direction and then in the other. The chain 87 is thus driven and rotates a sheave 89, the latter being keyed to a shaft 90 to which the sheave 46 is also keyed. The sheave 46 thus drives the chain 34 and reciprocates the carriage 20, as before explained.

The inner end of the track extends over the leer conveyer 92 and is moved step by step transversely of the leer as the bottles are deposited, so that they are arranged in rows extending across the leer. The rails 21, 22 may swing about pivot joints 93. The mechanism for moving the tracks transversely of the leer comprises a drum 95 having a spiral cam groove engaged by a finger 96 pivoted on the lower end of a bracket 97 attached to the swinging section of the rail 21. The finger 96 (as shown in Fig. 8) is so shaped that it is positively guided past the interesecting points in the spiral cam groove.

The mechanism for rotating the drum 95 step by step comprises a pulley 98 loose on the drum shaft and rotated in one direction by a weight 99 attached to a cord running on the pulley. A pawl 100 connected by a pivot pin 102 to said pulley, is provided with teeth to engage a gear 103 fixed to the drum shaft. The pawl 100 is connected through a cord or rod 104 to a head 105 mounted to slide on rods 106 extending lengthwise of the drum 80. The head 105 has pivoted thereto at 107 (Fig. 10) an L shaped latch 108 normally held in the Fig. 10 position by a spring 109, so that it projects into the path of the stem 86. As said stem moves toward the leer it strikes the latch 108 which swings about its pivot and permits the stem to pass. As said stem returns and strikes the latch from the other direction it moves said latch and with it the head 105 in a direction away from the leer. During this movement the latch slides along a bracket 110 until it reaches the end of said bracket when it is swung inward by a spring 109 to the Fig. 11 position, permitting the stem 86 to move beyond the latch. The outward movement of the head 105 first swings the pawl 100 about its pivot into engagement with the gear 103. The continued movement of the head then causes the gear 103 to be rotated, the pulley and gear moving as a unit. The drum 95 is thus rotated and operates to swing the track laterally a distance corresponding to the spacing of the bottles. After the latch 108 has been released from the stem 86 the weight 99 rotates the pulley 98 back to its starting position. The teeth on the pawl 100 may be chamfered to permit them to slip out of mesh with the gear wheel so that upon the release of the head 105 from the stem 86, the pawl swings about its pivot and releases the gear 103. This releasing movement of the pawl may be effected by the weight of an arm 111 bearing on the pawl. Said arm carries a dog 112 to engage any one of a series of notches 113 arranged around the drum, thereby locking the latter against untimely rotation.

After a row of bottles has been deposited on the leer conveyer 92 the latter is advanced a step to bring it into position for the next row of bottles. This movement of the leer conveyer is effected by a pawl 114 which drives a ratchet wheel 115 on the conveyer drum 116. The pawl is carried on a lever 117 pivoted at 118 and driven by a cam 119 attached to a gear 120 driven either directly by a pinion 121 on the drive shaft 76, or through suitable reduction gearing. Each complete rotation of the gear 120 causes the cam to lift the lever 117 and rotate the drum 116 one step.

The bottle conveying mechanism is preferably inclosed in a casing or housing 125 (Fig. 1) which extends from the glass forming machine to the leer so that the bottles or other ware are retained in a uniformly heated atmosphere and protected against chilling or sudden changes of temperature. The ware is thereby introduced into the leer in much better condition and at a uniform temperature, as uneven cooling or chilling of the ware is prevented. This construction permits the temperature of the confined atmosphere to be predetermined and controlled by the user, the temperature depending on the character of the ware and the distance it is carried. This control of heat conditions results in economy, speed of annealing and production of superior ware and all parts of the ware may be uniformly annealed. The molecular action is thus substantially uniform throughout the ware, the molecules being crystallized more speedily, uniformly and nearly simultaneously, thereby preventing the internal stresses and strains on the ware, which are produced when the molecules in one part of the ware have crystallized before they have in another part.

The housing 125 may be divided into upper and lower compartments by an intermediate partition 126. The latter is provided with a longitudinal slot 127 through which the support for the gripping jaws 19 extends, so that the ware carried thereby is in the lower compartment. The temperature of the latter may be kept higher than that of the upper compartment, if desired, the temperature being regulated to suit the requirements of the particular character of ware being transferred. Pipes 128 extending along the housing have nozzles entering the compartment which may serve as burners for maintaining a suitable high temperature, or which may be used for circulating a cooling medium where conditions make it desirable.

An endless belt 129 (Fig. 13) may be provided to overlie and close the slot 127 to prevent circulation of air through the slot. This belt is connected to the stem 57 by which it can be driven, said belt running on rolls 130. The glass forming machine 15 may be inclosed in a casing, as shown, (Fig. 1) so that the ware is not at any time exposed to the outside air, but carried directly from the mold into the leer in an inclosed chamber.

The operation of the mechanism may be summarized as follows:

As the carriage with the gripper nears the limit of its outward movement it strikes the buffer 52 (Fig. 2) and is thus arrested. The chain 34 continues its movement in the direction indicated by the arrows and drives the sheaves on the carriage so that the cam disk 38 is rotated. The gripping arms 19 have at this time been brought into position to engage a bottle in the open mold so that as the disk 38 rotates, the lever 62 operates to clamp the jaws on the bottle. The continued rotation of the disk causes the gear teeth 67 to drive the rack bar 58 upward and lift the bottle. The sleeve 84 (Fig. 4) has by this time reached the limit of its movement toward the leer and starts in the opposite direction, so that the chain 34 is driven in the reverse direction and moves the carriage toward the leer. As the carriage advances, the rack 70 operates to swing the gripping device with the bottle therein through an arc of about 180 degrees, so that it projects toward the leer. As the carriage reaches a position in which the bottle is over the leer conveyer it is arrested by the spring buffer 521. The chain 34 then rotates the cam disk, thereby first lowering the bottle and then releasing the clamp from the bottle, leaving the latter in an upright position on the leer. After each bottle is deposited the track is shifted laterally, as before described, a predetermined distance, so that the bottles are evenly spaced in the row. Contact between the bottles or other ware in the leer is thus prevented.

A second carriage 201 (Fig. 4) may be driven by a cable 341, the latter driven from a cable 137 running on sheaves 136, 138. The sheave 138 drives a sheave 139 on which the cable 341 runs. The cable 137 may be driven from the drum 80 in the same manner as the cable 87, that is, through a connection at the far side of the drum which is a duplicate of that shown in Fig. 10. In this way when the carriages are not working from battery molds, one carriage can be at the leer while the other is at the mold and travel in opposite directions. This is accomplished by setting the finger 83 of the cable or chain pulling head 84, 86 in the groove 82 worming in one direction and the finger of the corresponding head on the opposite side of the drum in the groove worming in the opposite direction.

Variations may be resorted to without departing from the spirit and scope of my invention.

What I claim is:

1. The combination with a glass forming machine, of a leer, transfer apparatus for automatically taking articles from said machine and conveying them into the leer, and means providing a closed passageway through which the articles are conveyed from the machine into the leer without exposure to the outside atmosphere.

2. The combination with a glass forming machine, of a leer, transfer apparatus for automatically taking articles from said machine and conveying them into the leer, means providing a closed passageway through which the articles are conveyed from the machine into the leer without exposure to the outside atmosphere, and means to regulate the temperature within said passageway.

3. The combination with a glass forming machine, of a leer, transfer apparatus for automatically taking articles from said machine and conveying them into the leer, means providing a closed passageway through which the articles are conveyed from the machine into the leer without exposure to the outside atmosphere, and means for heating said passageway.

4. The combination of a finishing mold, an oven, a carriage traveling between said mold and the oven, automatic means on the carriage to take articles from the mold and transfer them to the oven and a casing forming a closed passageway through which the articles are carried to the oven without exposure to the outside air.

5. The combination with a mold, of an oven, a carriage traveling between the mold and the oven, a gripping device on the carriage, means to operate the gripping device to engage an article at the mold and transfer it to the oven, a casing inclosing said carriage and gripping device, and a partition separating the casing into compartments in which the carriage and said article travel respectively.

6. The combination with a mold, of an oven, a carriage traveling between the mold and the oven, a gripping device on the carriage, means to operate the gripping device to engage an article at the mold and transfer it to the oven, a casing inclosing said carriage and gripping device, a partition separating the casing into compartments in which the carriage and said article travel respectively, and means for heating the compartment in which the article travels.

7. The combination with a mold, of an oven, a carriage traveling between the mold and the oven, a gripping device on the carriage, means to operate the gripping device to engage an article at the mold and transfer it to the oven, a casing inclosing said carriage and gripping device, a partition separating the casing into compartments in which the carriage and said article travel respectively, said partition being slotted to accommodate the connection between the carriage and said article, and a cover for said slot connected to travel with the carriage.

8. The combination of a finishing mold, an oven, a carriage traveling between said mold and the oven for transferring articles from the mold to the oven, and a casing forming a closed passageway through which the articles are carried to the oven, the carriage being arranged to travel outside of the casing.

9. The combination with an oven, of a carriage, a track on which the carriage travels to and from the oven, and means on said carriage to grip an article, lift it and carry it into the oven.

10. The combination with an oven track, a carriage, a chain or rope to drive the carriage along said track to and from the oven, a device on said carriage for gripping an article to be conveyed, and means to cause said gripping device to be actuated by said rope or chain.

11. The combination with an oven track, a carriage, a chain or rope to drive the carriage along said track toward and from the oven, a device on said carriage for gripping an article to be conveyed, means to arrest the carriage at the oven, and means to cause said rope or chain to actuate the gripping device when the carriage is arrested.

12. The combination with a leer, of means to convey articles into the leer, comprising a carriage, a flexible member to drive said carriage, a gripping device on said carriage, means to arrest the carriage, and automatic means actuated by said flexible driving member to operate the gripping device when the carriage is arrested.

13. Means to convey glass articles from a forming machine to a leer, comprising in combination, a carriage, sheaves thereon, a flexible driving member running over said sheaves and operable without rotating said sheaves to drive the carriage between said machine and the leer, and a gripping device on the carriage, said driving member operable to rotate said sheaves and actuate said gripping device when the carriage is arrested.

14. The combination with a leer, of means to convey articles to the leer comprising a carriage, a flexible driving member by which the carriage is driven toward and from the leer, a stop to arrest the carriage, a gripping device, an actuator therefor, and means whereby said actuator is operated by the flexible driving member when the carriage is arrested to grip and lift an article.

15. The combination with a leer, of a carriage, a track on which the carriage runs toward and from the leer, an endless driving element connected to the carriage to reciprocate the same on said track, a gripping device, a rotary member, connections between said member and the gripping device to operate the latter when said member is rotated, said driver running on said member, and means whereby said member is rotated by the driver while the carriage is at rest at the limit of its travel.

16. The combination with a glass blowing machine and a leer, of means for conveying articles from the machine to the leer, comprising a carriage, a bar carried thereby and movable up and down relative thereto, gripping jaws carried by said bar, a rotary cam, connections between said cam and gripping device to cause the latter to grip an article, means actuated by said cam to lift said bar after the gripping jaws have operated and thereby lift the article and support it while the carriage travels.

17. The combination with an oven, of a track extending therefrom, a carriage running on the track, a vertically disposed stem journaled in the carriage, a gripping device projecting from said stem, and means on said track to rotate said stem as the carriage travels and thereby swing said gripping device.

18. The combination with a mold and a leer, of a carriage, a chain or cable arranged to drive the carriage to and fro between the mold and the leer, a gripping device mounted on the carriage and arranged to project toward the mold, means operated by the chain to actuate said gripping device to cause it to engage an article at the mold and hold it while the carriage travels toward the leer, and means for swinging said gripping device as the carriage travels toward the leer so that it projects from the carriage toward the leer.

19. The combination with a finishing mold and a leer, of a track extending therebetween, a carriage traveling on said track, a gripping device on the carriage, a driver, and means whereby the driver is operable to actuate the gripping device to grip an article at the mold, lift said article, move the carriage toward the leer and thereby carry the article into the leer, lower said gripping device, release it from said article and return the carriage with the gripping device to position for engaging a succeeding article.

20. The combination with a leer, of a carrier by which the articles are conveyed to the leer, a spiral cam, means to rotate the cam, a member driven by the cam and guided to reciprocate lengthwise of the spiral, and speed multiplying driving connections between said member and carrier for moving the latter toward and from the leer.

21. The combination with a leer, of a carrier by which articles are conveyed to the leer, a drum, an endless spiral cam on the drum, means for rotating the drum, and means operated by said cam for moving the carrier toward and from the leer.

22. The combination with a leer, of a carriage, a track on which the carriage runs toward and from the leer, a gripping device on the carriage, means to actuate the gripping device to grip an article when the carriage is away from the leer and release said article within the leer, and means for moving the track step by step transversely of the leer.

23. The combination with a leer, of a carriage, a track on which the carriage runs toward and from the leer, means for moving the track step by step transversely of the leer, said means comprising a spiral cam, a connection between the cam and said track, and means for rotating the cam.

24. The combination with a leer, of a carrier by which articles are conveyed to the leer, a cable by which said carrier is driven, an endless spiral cam, means for rotating said cam, a second cable having a connection with the cam by which said second cable is reciprocated, and speed multiplying driving connections between said cables, whereby the first mentioned cable is driven at a higher speed than the second cable.

25. The combination with a leer, of a carriage, a track on which the carriage runs toward and from the leer, a spiral cam extending with its axis transverse to the leer, means to intermittently rotate said cam, and means forming a connection between the cam and said track, whereby the intermittent movement of the cam imparts a step by step movement to the track transversely of the leer.

26. The combination of a leer, a drum extending across the front of the leer, a spiral cam on the drum, a device for carrying articles into the leer, a frame on which said device travels, means connecting said frame with the spiral cam, and means to intermittently rotate the drum and thereby cause a step by step movement of said frame transversely of the leer.

27. The combination of a leer, a drum extending across the front of the leer, a spiral cam on the drum, a device for carrying articles into the leer, a frame on which said device travels, means connecting said frame with the spiral cam, and means to intermittently rotate the drum and thereby cause a step by step movement of said frame transversely of the leer, said spiral being continuous, and comprising right and left hand portions whereby said frame is moved first in one direction across the leer and then in the opposite direction.

Signed at Washington, in the District of Columbia, this 4th day of October, 1918.

CLYDE R. LOTT.